United States Patent
Edinger

[15] 3,647,052
[45] Mar. 7, 1972

[54] TRANSPORT ATTACHMENT FOR GRAIN AUGERS

[72] Inventor: Calvin R. Edinger, Cathay, N. Dak.
[22] Filed: Nov. 6, 1969
[21] Appl. No.: 874,634

[52] U.S. Cl.......................................................198/233
[51] Int. Cl...............................B65g 41/00, B65g 33/14
[58] Field of Search......................................198/233, 120.5

[56] References Cited

UNITED STATES PATENTS

| | | | |
|---|---|---|---|
| 2,528,917 | 11/1950 | Slocum | 198/120.5 |
| 2,623,624 | 12/1952 | Slocum | 198/233 X |
| 3,081,862 | 3/1963 | Knoedler | 198/233 X |
| 3,225,744 | 12/1965 | Procter | 198/233 X |

FOREIGN PATENTS OR APPLICATIONS 283,615  10/1952  Switzerland...........................198/233

*Primary Examiner*—Joseph Wegbreit
*Attorney*—Zarley, McKee & Thomte

[57] ABSTRACT

A transport attachment for grain augers to permit the auger to be manually moved, comprising a support means movably mounted on the grain auger and having a wheel means extending downwardly therefrom. The support means comprises a split tubular member which is selectively slidably mounted on the grain auger above the lower thereof which is selectively locked in first and second positions thereon. The wheel means engages the ground to support the lower end of the grain auger thereabove when the support means is in its first or transport position. The support means and wheel means are moved upwardly on the grain auger to the said second position to move the wheel means out of ground engagement thereby permitting the grain auger to be conventionally operated.

1 Claims, 4 Drawing Figures

PATENTED MAR 7 1972
3,647,052
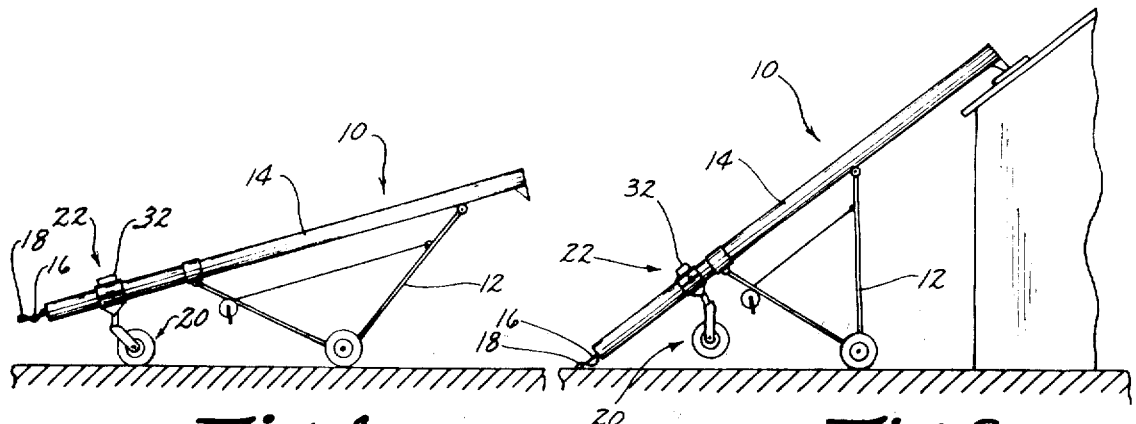
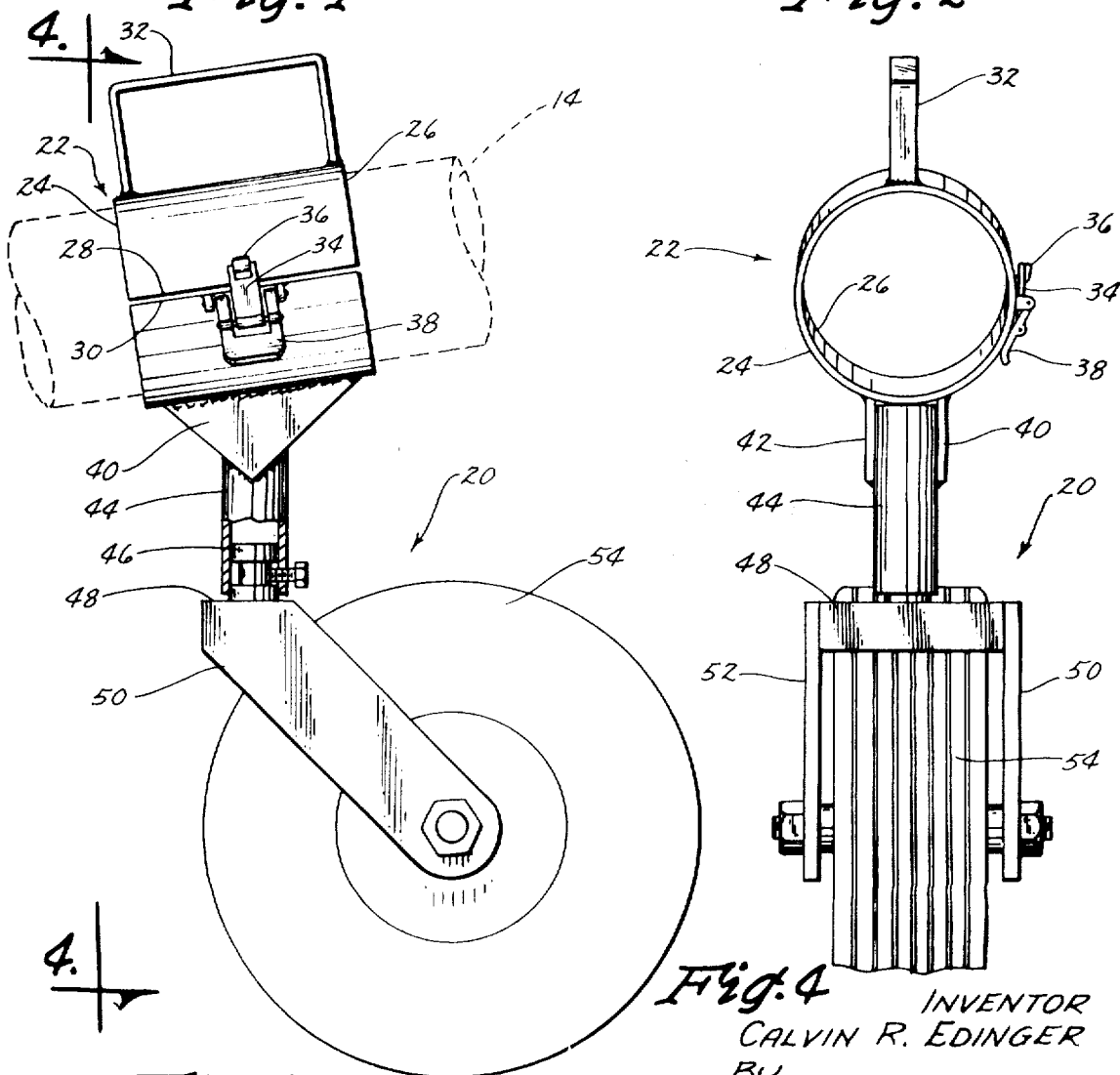
INVENTOR
CALVIN R. EDINGER
BY
Zarley, McKee & Thomte
ATTORNEYS

TRANSPORT ATTACHMENT FOR GRAIN AUGERS

Conventional grain augers generally consist of a two-wheel carriage which supports an elongated tubular housing having a rotatable shaft extending therethrough with spiral flighting mounted thereon. The two wheels of the carriage form first and second points of suspension for the grain auger while the lower end of the housing or shaft forms the third point of the three-point suspension. In other words, the lower end of the housing usually rests upon the ground or some other support when the grain auger is being used. When it is desired to move the grain auger between storage bins or the like, it is necessary to lift the lower end of the grain auger from the ground and manually push or pull the grain auger into position. The lifting of the lower end of the grain auger is extremely difficult due to the heavy construction and size thereof.

Therefore, it is a principal object of this invention to provide a wheeled transport attachment for grain augers.

A further object of this invention is to provide a wheeled transport attachment for grain augers which may be moved from transport to nontransport positions.

A further object of this invention is to provide a wheeled transport attachment for grain augers which is quickly and easily moved with respect to the grain auger.

A further object of this invention is to provide a wheeled transport attachment for grain augers which aids in moving the grain auger.

A further object of this invention is to provide a wheeled transport attachment for grain augers which permits a single person to maneuver the heaviest grain auger with ease.

A further object of this invention is to provide a wheeled transport attachment for grain augers which is easily and simply attached to the grain auger.

A further object of this invention is to provide a wheeled transport attachment for grain augers which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically point out in the claims, and illustrated in the accompanying drawings in which:

FIG. 1 is a side view of the attachment mounted on a grain auger;

FIG. 2 is a view similar to that of FIG. 1 except that the attachment of this invention has been moved to a nontransport position;

FIG. 3 is a side view of the attachment of this invention; and

FIG. 4 is an end view of the attachment of this invention.

A conventional grain auger is illustrated in FIG. 1 and is generally designated by the reference numeral 10. Grain auger 10 includes a wheeled carriage means 12 which supports the tube 14 in conventional fashion and including means to raise or lower the upper end thereof as desired. A rotatable shaft 16 extends through the tube 14 and has spiral flighting 18 mounted thereon. As seen in FIG. 1, the lower end of the flighting and shaft are exposed below the lower end of the tube 14. The shaft 16 is rotated by a conventional power means to cause the grain to be conveyed upwardly through the tube 14 in conventional fashion.

The attachment of this invention is generally designated by the reference numeral 20. Attachment 20 includes a split tubular member 22 having a lower end 24, upper end 26, and opposite end edges 28 and 30. Member 22 has a handle 32 secured thereto which extends upwardly therefrom to provide means for not only moving the attachment with respect to the grain auger but also providing a means for maneuvering the grain auger itself as will be described hereinafter. A clamp means or latch means 34 is provided on the tubular member 22 and includes clamp portions 36 and 38. Clamp means 34 is of the "overcenter" quick latch type and is designed to move the end edges 28 and 30 towards each other to cause the tubular member 22 to frictionally embrace the tube 14. Tubular member 22 is preferably formed of 10-gauge rolled steel to provide the necessary strength and rigidity to the member.

A pair of spaced-apart gusset plates 40 and 42 are welded to the underside of tubular member 22 and have a pipe 44 secured therebetween by welding or the like which extends downwardly therefrom as illustrated in the drawings. Pipe 44 has a shaft 46 rotatably mounted therein and extending downwardly therefrom as illustrated in FIGS. 3 and 4. Plate 48 is secured to the lower end of shaft 46 by welding or the like and has a pair of spaced-apart yoke members 50 and 52 secured to opposite sides thereof which extend downwardly and laterally therefrom. A wheel 54 is rotatably mounted between the yoke members 50 and 52 by any convenient means such as an axle or the like extending through the wheel and being rotatably journaled in the yoke members.

The attachment is initially mounted on the grain auger by simply opening or raising the clamp means 34 and causing the lower end of tube 14 to be received in the interior of tubular member 22. If difficulty is encountered in inserting the tube 14 in the interior of member 22, the end edges 28 and 30 may be manually separated to temporarily increase the inside diameter of the tubular member 22. The attachment is then slidably moved upwardly on the tube 14 to the position illustrated in FIG. 1. Clamp means 34 is then locked which causes the end edges 28 and 30 of the tubular member 22 to be moved towards each other so that the interior surface of tubular member 22 frictionally engages the exterior surface of the tube 14. When the clamp means 34 is in its locked position, the frictional engagement of the tubular member 22 with the tube 14 will prevent inadvertent movement of the attachment with respect to the grain auger. In the position of FIG. 1, it can be seen that the wheel 54 of the attachment 20 engages the ground and acts as a caster wheel support to support the lower end of the grain auger above the ground. In FIG. 1, the wheel 54 forms the third point of the three-point suspension and permits the grain auger to be easily moved from one location to another without the necessity of the lower end of the grain auger being manually lifted and maintained above the ground as the auger is being moved.

When the grain auger has been properly positioned and it is desired to use the auger in conventional fashion, the clamp means 34 is unlocked so the attachment may be slidably moved upwardly on the tube 14 from the position of FIG. 1 to the position of FIG. 2. The attachment is moved upwardly on the tube 14 until the lower end of the grain auger rests upon the ground and until the wheel 54 is out of ground engagement. When the attachment has been so positioned, the clamp means 34 is again locked to maintain the attachment illustrated in FIG. 2. The preferred nontransport position is illustrated in FIG. 2 but it should be noted that the tubular member 22 may be rotated with respect to the tube 14 to move the wheel 54 out of ground engagement if so desired. If the tubular member 22 is so rotated with respect to the tube 14, the wheel 54 would be positioned outwardly of the tube 14 and would interfere slightly with normal operation of the grain auger. It should also be noted that the tubular member 22 could be formed of two semitubular members hingedly secured together but the embodiment illustrated in the drawings is the preferred embodiment.

Thus it can be seen that a unique attachment has been provided for grain augers which eliminates the heavy lifting and work ordinarily encountered when a grain auger is moved from one bin to another. The attachment of this invention eliminates the need of a truck or tractor to move the grain auger from one storage bin to another. With the attachment of this invention, a single person can maneuver the heaviest grain auger with ease. Thus it can be seen that the attachment of this invention accomplishes at least all of its stated objectives.

I claim:

1. In combination, a grain auger conveyor means comprising an elongated tubular housing having upper and lower ends, a spiral flighting means rotatably mounted in said tubular housing, a wheeled carriage means supporting said tubular housing intermediate said upper and lower ends, and having a frame means secured thereto and first and second spaced-apart wheels secured to said frame means, said wheels being in continual ground engagement, means on said wheeled carriage means for changing the angle of inclination of said tubular housing with respect to the ground so that said upper end may be selectively raised and lowered, a tubular member selectively movably embracing said tubular housing between the lower end of said housing and said wheeled carriage means, a support member secured to said tubular member and extending downwardly therefrom, a single caster wheel member secured to said support member for selective ground engagement, said tubular member being movable between lower and upper positions on said housing, said caster wheel being in engagement with the ground to support the lower end of said tubular member out of engagement when said tubular member is in its said lower position, said caster wheel being out of ground engagement when said tubular member is in its said upper position, said first and second wheels engaging the ground when said tubular member is in its lower and upper positions, said tubular housing being supported only by its lower end and said wheeled carriage means when said tubular member is in its upper position, said tubular housing being supported only by said caster wheel and said wheeled carriage means when said tubular member is in its said lower position.

* * * * *